United States Patent
Oiwa et al.

(10) Patent No.: US 8,491,837 B2
(45) Date of Patent: Jul. 23, 2013

(54) NI-BASED BRAZING COMPOSITION, BRAZE REPAIR METHOD, AND BRAZE-REPAIR STRUCTURE

(75) Inventors: Naoki Oiwa, Yokohama (JP); Sadao Nishikiori, Tokyo (JP); Tsukasa Wakabayashi, Tokyo (JP); Junji Tsuji, Tokyo (JP)

(73) Assignee: IHI Corporation (JP)

( * ) Notice: Subject to any disclaimer, the term of this patent is extended or adjusted under 35 U.S.C. 154(b) by 469 days.

(21) Appl. No.: 12/676,065

(22) PCT Filed: Sep. 2, 2008

(86) PCT No.: PCT/JP2008/065782
§ 371 (c)(1),
(2), (4) Date: May 6, 2010

(87) PCT Pub. No.: WO2009/031545
PCT Pub. Date: Mar. 12, 2009

(65) Prior Publication Data
US 2010/0215984 A1   Aug. 26, 2010

(30) Foreign Application Priority Data
Sep. 3, 2007   (JP) ............... P2007-227962

(51) Int. Cl.
*C22C 19/05*   (2006.01)
(52) U.S. Cl.
USPC ........... 420/444; 420/442; 420/445; 420/456; 420/460
(58) Field of Classification Search
None
See application file for complete search history.

(56) References Cited

U.S. PATENT DOCUMENTS

| | | | | |
|---|---|---|---|---|
| 3,853,548 | A | * | 12/1974 | Fairbanks et al. ............. 420/444 |
| 4,135,656 | A | * | 1/1979 | Stern ........................ 228/262.31 |
| 4,519,537 | A | * | 5/1985 | Heinrich et al. ............. 228/221 |
| 4,745,037 | A | * | 5/1988 | DeCristofaro et al. ....... 428/678 |
| 5,118,028 | A | | 6/1992 | Ogawa et al. |
| 6,187,450 | B1 | | 2/2001 | Budinger et al. |
| 6,454,885 | B1 | | 9/2002 | Chesnes et al. |
| 6,503,349 | B2 | | 1/2003 | Pietruska et al. |
| 7,156,280 | B1 | | 1/2007 | Jiang et al. |
| 7,279,229 | B2 | * | 10/2007 | Budinger et al. ............. 428/557 |
| 2005/0067061 | A1 | | 3/2005 | Huang et al. |
| 2007/0039177 | A1 | | 2/2007 | Yoshioka et al. |

FOREIGN PATENT DOCUMENTS

| | | |
|---|---|---|
| JP | 3-238169 A | 10/1991 |
| JP | 2001-179432 A | 7/2001 |
| JP | 2001-287085 A | 10/2001 |

(Continued)

OTHER PUBLICATIONS

International Search Report dated Dec. 9, 2008, issued in corresponding international application No. PCT/JP2008/065782.

(Continued)

*Primary Examiner* — Jennifer McNeil
*Assistant Examiner* — Adam Krupicka
(74) *Attorney, Agent, or Firm* — Ostrolenk Faber LLP (57) ABSTRACT

A Ni-based brazing composition at least containing, in mass %, 1.0% or more and 1.3% or less of B, 4.0% or more and 6.0% or less of Si, and the balance consisting of Ni and unavoidable impurities, wherein the brazing composition forms wherein the brazing composition forms dispersed phase containing B or Si in a metal texture after the brazing, and a maximum length of the dispersed phase is 30 μm or less.

6 Claims, 5 Drawing Sheets

FOREIGN PATENT DOCUMENTS

| | | |
|---|---|---|
| JP | 2003-48065 A | 2/2003 |
| JP | 2003-200272 A | 7/2003 |
| JP | 2005-500908 A | 1/2005 |
| JP | 2005-103641 | 4/2005 |
| JP | 2006-46147 A | 2/2006 |
| JP | 2007-185712 A | 7/2007 |
| WO | WO 02/50323 A2 | 6/2002 |

OTHER PUBLICATIONS

W.A. Demo et al., "Improving Repair Quality of Turbine Nozzles Using SA650 Braze Alloy", Superalloys 2000, TMS 2000 (2000) pp. 713-721.

C. T. Sims et al., "Superalloys II", John Willey & Sons, (1987) (7 pages).

* cited by examiner

NI-BASED BRAZING COMPOSITION, BRAZE REPAIR METHOD, AND BRAZE-REPAIR STRUCTURE

CROSS REFERENCE TO RELATED APPLICATIONS

The present application is a 35U.S.C. §371 National Phase conversion of PCT/JP2008/065782, filed Sep. 2, 2008, which claims benefit of Japanese Application No. 2007-227962, filed Sep. 3, 2007, the disclosure of which is incorporated herein by reference. The PCT International Application was published in the Japanese language.

TECHNICAL FIELD

The present invention relates to a Ni-based brazing composition, braze-repair method, and a braze-repair structure.

BACKGROUND ART

Various parts of a gas turbine such as a stationary vane, a moving blade, and a combustor liner used in an air craft engine or a gas turbine of an industrial appliance are exposed to high temperature conditions for a long time. Therefore, metallic materials having excellent heat resistance, for example, a Ni-based superalloy or a Co-based superalloy is used in those parts. However, parts of gas turbines made of such heat resistant alloys occasionally occur damage such as cracks and fractures caused by thermal fatigue when the parts are used for a long time under high temperature conditions and are subjected to repeated stress (e.g., by vibration).

Conventionally, when such damage is found under periodic inspection or the like, the damaged portions are repaired by brazing (for example, see Patent Reference 1: Japanese Unexamined Patent Application, First Publication, No. 2005-103641). Practically, in the braze repairing of gas turbine parts, repairing of the damaged portion is performed by preparing a repair material by mixing an Ni-based brazing material powder added with melting point lowering elements such as B and Si and alloy powder having the same or closely similar composition as the composition of the base material, filling the repair material in the damaged portion, and subjecting the damaged parts to heat treatment under a vacuum (reduced pressure) atmosphere.

Further, repair has been proposed using a brazing material in which the content of B is reduced and strengthening elements such as Mo and W are added so as to improve the creep properties of the repaired portion in the repair structure (Non Patent Reference 1: W. A. Demo, S. Ferrigno, D. Budinger, and E. Huron, Improving Repair Quality of Turbine Nozzles Using SA659 Braze Alloy, Superalloys 2000, January 9, 2000, TMS2000, pages 713-720).

DISCLOSURE OF THE INVENTION

Problems to be Solved by the Invention

Since the Ni-based brazing material used in the above-described braze repair is added with elements such as B and Si that lower the melting point, the brazing material is molten (fused) to form a brazing liquid at a temperature lower than the melting point of the base material and fills the interstices in the base material and the alloy powder. In the same time, constituent elements of the brazing material diffuses into the interior of the base material and the alloy powder. Thus, the base material and the alloy powder are joined in integral.

However, B added in the Ni-base brazing material forms granular or aggregated hard and brittle phase in the metallic structure after the brazing. Where this phase increases, the mechanical properties of the repaired portion are deteriorated. On the other hand, excessive addition of Si also results in the formation of granular or aggregated hard and brittle phase in the metallic structure after brazing.

Although Non-Patent Reference 1 proposes a method to reduce the content of B added to the brazing material thereby improving the creep strength of the repaired portion, there is no known method to provide excellent thermal fatigue strength to the repaired portion while improving creep strength of the repaired portion.

Based on the consideration of the above-described conventional circumstances, an object of the present invention is to provide a Ni-based brazing composition that enables repair by brazing capable of refining B or Si-containing phase formed in the metal texture after the brazing, and while keeping the melting point of the brazing material at a temperature similar to the conventional material, providing excellent mechanical properties such as fatigue strength to the metal after the brazing, while providing creep properties of the conventional level.

Another object of the present invention is to provide a braze repair method which enables appropriate repair of a damaged portion occurring in the members by using the Ni-based brazing composition, and to provide a repair structure appropriately repaired by the braze repair method.

Solutions of the Problems

The present invention provides the below-described solutions.

(1) A first aspect of the present invention is a Ni-based brazing composition at least containing, in mass %, 1.0% or more and 1.3% or less of B, 4.0% or more and 6.0% or less of Si, and the balance consisting of Ni and unavoidable impurities.

Where brazing is performed by using the above-described Ni-based brazing composition, it is possible to form dispersed phase containing B or Si in the metal texture formed by melting (fusion) and subsequent solidification of brazing material containing the above-described composition while controlling the maximum length of the dispersed phase to be 30 µm or less.

The above-described Ni-based brazing composition may further contain, in mass %, 25% or less of Cr, 15% or less of Co, 4% or less of Al, and 4% or less of Ta.

The Ni-based brazing composition according to any one of the above-described constitutions may further contain one or two or more selected from a group consisting of Pd, Zr, and Hf.

According to any one of the above-described Ni-based brazing compositions, the brazing composition forms dispersed phase containing B or Si in a metal texture after the brazing, wherein maximum length of the dispersed phase is 30 µm or less.

Preferably, the above-described brazing composition forms matrix of polycrystalline alloy in the metal structure after the brazing, and average diameter of the alloy of the matrix is 100 µm or less.

The above-described Ni-based brazing composition may be used as a raw material of a brazing material used in a braze repair method to repair a defect generated in a member by brazing. By using the above-described composition, it is possible to control the maximum length of dispersed phase containing B or Si formed in the metal structure of a repaired portion to be 30 μm or less in a repair structure (repaired member) where the damage is repaired.

(2) A second aspect of the present invention is a braze repair method to repair a defect generated in a member by brazing, the method including: preparing a repair material including a brazing material; filling the repair material in a defect portion of the member; performing heating to form a brazing liquid by heating a portion of the member including the defect portion filled by the repair material; and performing cooling the portion to solidify the brazing liquid, wherein a maximum length of the dispersed phase including B or Si are controlled to be 30 μm or less in a metal texture of the repaired portion formed after the cooling.

Preferably, in the above-described repair method, the repair material includes brazing material powder, and an alloy powder having a melting point higher than that of the brazing material powder.

Preferably, during performing the cooling, rim portions are crystallized from the brazing liquid around the outer surfaces of the alloy powder particles.

Preferably, constituent elements of the brazing liquid diffuse into the alloy powder particles during performing the heating, and the rim portions are formed in integral with the alloy powder particles during performing the cooling.

Preferably, in the above-described braze repair method, the brazing material is a Ni-based brazing material having a composition at least containing, in mass %, 1.0% or more and 1.3% or less of B, 4.0% or more and 6.0% or less of Si, with the balance consisting of Ni and unavoidable impurities.

In the above-described braze repair method, the brazing material may be the Ni-based brazing material further containing, in mass %, 25% or less of Cr, 15% or less of Co, 4% or less of Al, and 4% or less of Ta.

The Ni-based brazing material according to any of the above-described constitutions used in the braze repair method may further contain one or two or more selected from the group consisting of Pd, Zr, and Hf.

Preferably, in the above-described braze repair method, the metal texture of the repaired portion formed after the brazing includes a matrix of polycrystalline alloy and a dispersed phase (particles of a dispersed phase) dispersed in the matrix, wherein an average diameter of the alloy of the matrix is 100 μm or less.

The Ni-based brazing material used in the braze repair method of the present invention may be formed of the brazing composition according to the above-described first aspect.

(3) A third aspect of the present invention is a repair structure comprising a base material, a repaired portion formed by braze repairing a defect (damaged portion) of the base material, wherein the repaired portion includes a matrix composed of polycrystalline alloy, and dispersed phase (dispersed particles) dispersed in the matrix; the dispersed phase contains B or Si, and has a maximum length of 30 μm or less; and at least a partial portion of the dispersed phase and the matrix are composed of solidified texture formed by melting and solidification of a brazing material.

Preferably, the matrix of the repaired portion further includes alloy particles having a melting point higher than that of the repaired portion.

Preferably, average grain diameter of the alloy of the matrix is 100 μm or less.

Preferably, in the above-described repaired portion, at least a partial portion of the solidified texture constitutes rim portions crystallized around the alloy particles. Preferably, the alloy particles and the rim portions are integrated by element diffusion.

Preferably, in the above-described repair structure, the brazing material is a Ni-based brazing material having a composition at least containing, in mass %, 1.0% or more and 1.3% or less of B, 4.0% or more and 6.0% or less of Si, with the balance consisting of Ni and unavoidable impurities.

Preferably, in the above-described repair structure, the brazing material is the Ni-based brazing material further containing, in mass %, 25% or less of Cr, 15% or less of Co, 4% or less of Al, 4% or less of Ta.

In the above-described repair structure, the Ni-based brazing material of any of the above-described constitution may further contain one or two or more selected from the group consisting of Pd, Zr, and Hf.

The above-described repair structure may be a repair structure formed by repairing of a base material having a damaged portion in accordance with the repair method of the above-described second aspect.

Effect of the Invention

As described above, in the present invention, by controlling the content of B and Si in the optimum range for achieving sufficient lowering of the melting point as a brazing material while avoiding coarsening of B-containing or Si-containing phase, it is possible to provide a Ni-based brazing composition that enables braze repairing that ensures excellent mechanical properties such as fatigue strength, while keeping the melting point of the brazing material a temperature similar to the conventional brazing material, and keeping creep properties of the metal structure after brazing at a level similar to the conventional case.

In accordance with the present invention, by using the Ni-based brazing composition, it is possible to provide a braze repair method that allows appropriate repair of a damaged portion occurring in a member, and a repair structure appropriately repaired

BRIEF EXPLANATION OF DRAWINGS

FIGS. 1A to 1C are cross sections of a turbine nozzle shown as an example of a repair structure of the present invention.

BEST MODE FOR CARRYING OUT THE INVENTION

Hereafter, a Ni-based brazing composition, braze repair method, and a repair structure according to the present invention is explained with reference to the drawings. Ni-based brazing composition.

Firstly, a Ni-based brazing composition according to the present invention is explained.

The Ni-based brazing composition according to the present invention at least contains 1.0% or more and 1.3% or less by mass of B, 4.0% or more and 6.0% or less by mass of Si, with the balance being consisting of Ni and unavoidable impurities. By using the brazing composition, granular or aggregated particles of dispersed phase containing B or Si are formed in a metal texture after the brazing, and maximum length of the dispersed phase is controlled to be μm or less.

The Ni-based brazing composition according to the present invention may further contains 25% or less by mass of Cr, 15% or less by mass of Co, 4% or less by mass of Al, and 4% or less by mass of Ta.

In the following, the reason for controlling the elements and their content in the Ni-based brazing composition according to the present invention and a metal texture after the brazing are explained.

Boron (B): 1.0% or More by Mass and 1.3% or Less by Mass.

B is an element that lowers melting point. However, where a content of B is less than 1.0% by mass, the melting point does not decrease sufficiently, and the wettability of the brazing material is deteriorated. On the other hand, where the content of B exceeds 1.3% by mass, the dispersed phase containing B or Si is coarsened and creep properties are specifically deteriorated. Therefore, content of B is preferably, in mass %, 1.0% or more and 1.3% or less, and more preferably, 1.1% or more and 1.2% or less.

Silicon (Si): 4.0% or More by Mass and 6.0% or Less by Mass.

Si is an element that lowers melting point. By adding Si with B, it is possible to reduce the added amount of B. However, where a content of Si is less than 4.0% by mass, melting point does not decrease sufficiently, and wettability of the brazing material is deteriorated. On the other hand, where the content of B exceeds 6.0% by mass, the dispersed phase containing B or Si is coarsened and creep properties are specifically deteriorated. Therefore, the content of Si is preferably, in mass %, 4.0% or more and 6.0% or less, and more preferably, 4.5% or more and 5.5% or less.

Chromium (Cr): 25% or Less by Mass.

Cr is an element that contributes to solid solution hardening and improves oxidation resistance, and may be added where necessary. However, where content of Cr exceeds 25% by mass, wettability of the brazing material is deteriorated. Therefore, content of Cr is preferably 25% or less by mass.

Cobalt (Co): 15% or Less by Mass.

Co is an element that contributes to solid solution hardening and may be added where necessary. However, where content of Co exceeds 15% by mass, wettability of the brazing material is deteriorated. Therefore, content of Co is preferably 15% or less by mass.

Aluminum (Al): 4.0% by Mass or Less

Al is an element that contributes to precipitation strengthening and improves oxidation resistance, and is added where necessary. However, where content of Al exceeds 4.0% by mass, wettability of the brazing material is deteriorated. Therefore, content of Al is preferably 4.0% or less by mass.

Tantalum (Ta): 4.0% or Less by Mass.

Tantalum is an element that contributes precipitation strengthening, and is added where necessary. However, where content of Ta exceeds 4.0% by mass, wettability of the brazing material is deteriorated. Therefore, content of Ta is preferably 4.0% or less by mass.

Balance: Ni and Unavoidable Impurities.

As the unavoidable impurities, oxygen, nitrogen or the like may be included. Where a content of each of the impurity elements is 0.05% or less by mass the impurities have no specific influence on the microstructure after the brazing or mechanical properties.

The Ni-based brazing composition according to the present invention may further contain one or two or more selected from Pd, Zr, and Hf as an element that lowers the melting point. Where such a melting point lowering element is added, it is preferable to control the amount of addition within a range such that the maximum length or dispersed phase containing B or Si of the brazed portion does not exceeds 30 μm.

Metal Texture (Structure) After the Brazing

The Ni-based brazing composition according to the present invention generates granular or aggregated dispersed phase containing B or Si in the metal texture after the brazing. Here, the metal texture after the brazing denotes a solidified texture formed by melting and subsequent solidification of the Ni-based brazing composition according to the present invention or brazing material containing the Ni-based brazing material. The solidified texture includes polycrystalline metal and the dispersed phase dispersed in the polycrystal. By specifying above-described optimum content range of B and Si, it is possible to control the maximum length of the dispersed phase containing B or Si to 30 μm or less, more preferably 10 μm or less. Where the solidified texture has a microstructure in which the maximum length of the dispersed phase is 30 μm or less, while using a brazing material having a melting point similar to the conventional case, and while keeping the similar creep property in the metal after the brazing as in the conventional case, it is possible to perform repair by brazing that further improves other mechanical properties such as fatigue strength (for example, thermal fatigue strength). As a dispersed phase containing B or Si, it is possible to observe boride, silicide or the like.

In the present invention, fine grains of dispersed phase containing B or Si are formed uniformly. Therefore, growth of the metal polycrystal is inhibited by the dispersed phase, and the average grain diameter is refined. In the present invention, it is possible to control the average grain diameter of the solidified metal texture to 100 μm or less. Therefore, by performing repairing of a member using the brazing composition according to the present invention, it is possible to improve mechanical properties of the repaired portion. A more preferable average grain diameter of the metal polycrystal is 50 μm or less.

Braze Repair Method and Repair Structure

Next, braze repair method and a repair structure according the present invention are explained.

A brazing material that contains the above-described Ni-based brazing composition is used in a braze repair method applying the present invention. The brazing material may be a brazing material powder prepared to satisfy the compositional range of the Ni-based brazing composition of the present invention. The brazing material powder may be a powder of a single alloy. Alternatively, the powder may be a mixed powder of a plurality of metal powders prepared such that a total composition satisfies the above-described compositional range. The above-described powder is molten at a brazing temperature.

Preferably, grain diameter of the Ni-based brazing material powder is 10 μm or more and 300 μm or less. Where the grain diameter of the Ni-base brazing material powder is smaller than 10 μm, yield of the powder during production is deteriorated and increases the production cost. On the other hand, where the grain diameter of the Ni-based brazing material powder exceeds 300 μm, it is difficult to form uniform (homogeneous) melt (brazing liquid) during the brazing process. Therefore, grain diameter of the Ni-based brazing material powder is preferably 10 μm or more and 300 μm or less, more preferably, 10 μm or more and 150 μm or less. Where the powder is used to fill a minute crack, it is more preferable to control the grain diameter of the brazing material powder to be 90 μm or less.

Repair Material

Where a damage generated in a member of a structure is repaired, repair material including the above-describe brazing material is prepared.

The repair material may be a material that includes the above-described Ni-base brazing material powder, and a powder of an alloy (hereafter, referred to as an alloy powder) having a melting point higher than that of the Ni-based brazing material powder.

Preferably, the alloy powder mixed with the brazing material powder is a powder of an alloy that has mechanical properties substantially similar to those of the base material. Therefore, it is preferable that the alloy powder is a powder of an alloy having a composition close to that of the base material. The alloy powder may be composed of a powder of single species of alloy, or composed of powders of two or more alloys. Where the base material is made of superalloy, the alloy powder mixed with the brazing material powder may also be a superalloy powder. Preferably, the above-described alloy powder has a composition substantially similar to that of the base material.

Preferably, the grain diameter of the alloy powder is 10 μm or more. Where the grain diameter of the alloy powder is smaller than 10 μm, the yield of the powder during production is deteriorated and increases the production cost.

On the other hand, where the grain diameter of the alloy powder exceeds 90 μm, it is difficult to fill the powder in a small crack.

Therefore, grain diameter of the alloy powder is preferably 10 μm or more and 90 μm or less, more preferably, 10 μm or more and 38 μm or less.

In the preparation of the repair material, it is preferable to mix the alloy powder and the brazing material powder such that the volume of the alloy is 9 times the volume of the brazing material.

The repair material may include a binder to form a slurry.

Although a preferable grain diameter of the alloy powder is described above, in the case of repairing a defect portion of a relatively large size, a coarse alloy powder, or pieces of alloy may be used in addition to the above-described repair material. Although the above-described repair material is prepared by mixing the Ni-based brazing material powder and an alloy powder, it is possible to use a metal with a high melting point as an alternative to the alloy.

Repairing Process

Next, the thus prepared repair material is filled in the damaged portion. Subsequently, a portion at least including the damaged portion is subjected to heat treatment (a heat treatment step). The heat treatment temperature is controlled to be lower than the melting point of the base material and not lower than the melting point of the brazing material. At this time, the Ni-based brazing material powder is molten and joins the base material and the mixed alloy powder in integral along with diffusion of component elements into the interior of the base material and the alloy powder. Next, the heated portion is cooled to solidify the molten brazing material (cooling step).

The above-described heat treatment is performed under a vacuum atmosphere.

Texture of the Repaired Portion

A repair structure obtained by performing the above-described repairing comprises a main portion composed of the base material, and a repaired portion. The repaired portion has a texture in which a solidified texture formed by melting and solidification of the brazing material fills the interstices of the alloy powder. The solidified texture includes polycrystalline alloy, and dispersed phase containing B or Si dispersed in the polycrystalline alloy. The dispersed phase is composed of fine grained particles having a maximum length of 30 μm. Under the observation of the repaired portion, it is possible to observe dispersed phase containing B and Si dispersed in the polycrystalline matrix. The polycrystalline body constituting the matrix is constituted of alloy particles (plural alloy particles) used in the repair material, rim portions crystallized from brazing liquid around the alloy particles, and crystal grains crystallized from the brazing liquid or the like. Since element diffusion from the brazing liquid to the alloy powder occurs during the heating process, the diffused elements have a continuous concentration profile in the boundary between the alloy powder particles and the rim portions.

As described above, in the present invention, growth of coarse crystals during solidification of the brazing liquid is inhibited by the presence of fine dispersed phase. In addition, during the formation of the rim portion around the alloy powder particles, growth of the rim portion is inhibited by the fine dispersed phase. In addition, the alloy powder is partially molten at a surface portion being in contact with the brazing liquid during the heating process. Therefore, when the grain diameter of the alloy powder is controlled to be 90 μm or less in the present application, it is possible to control the average grain diameter of the metal (alloy) of the matrix to be 100 μm or less.

In general, the solidified texture and the alloy powder are not distinguished in a texture of the repaired portion since the alloy powder and the brazing material reacts with each other by diffusion and melting. However, when the alloy powder has a small amount and brazing liquid has a relatively large fraction, the resultant solidified texture is clearly distinguished from the alloy powder. In such a case, it is impossible to exert sufficient mechanical properties. Therefore, a ratio of the solidified texture of the brazing liquid to the alloy powder texture must be 1:not less than 9 by volume ratio. That is, it is necessary that the volume of the alloy powder texture is 9 or greater times the volume of the solidified texture of the brazing liquid.

Where the coarse alloy is added to the repair material to mend a large damaged portion, the volume fraction may be different from the above-described range in a partial portion.

Figure 1A:
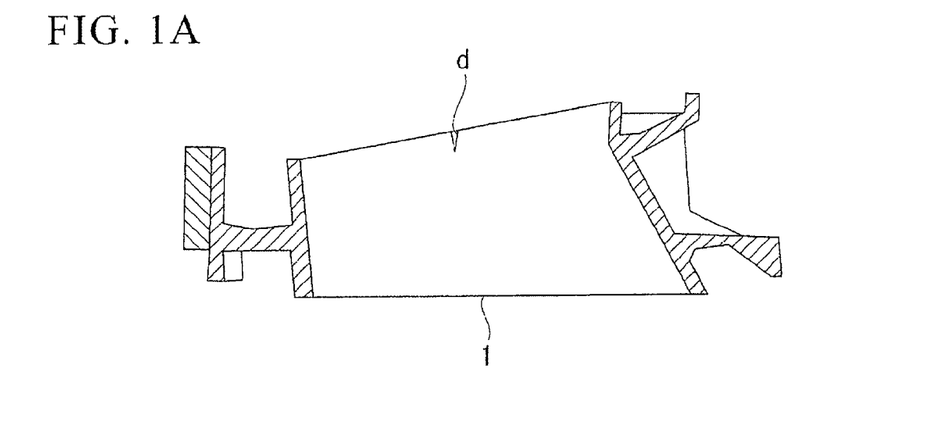
FIG. 1A shows a schematic cross section of a turbine nozzle.
Figure 1B:
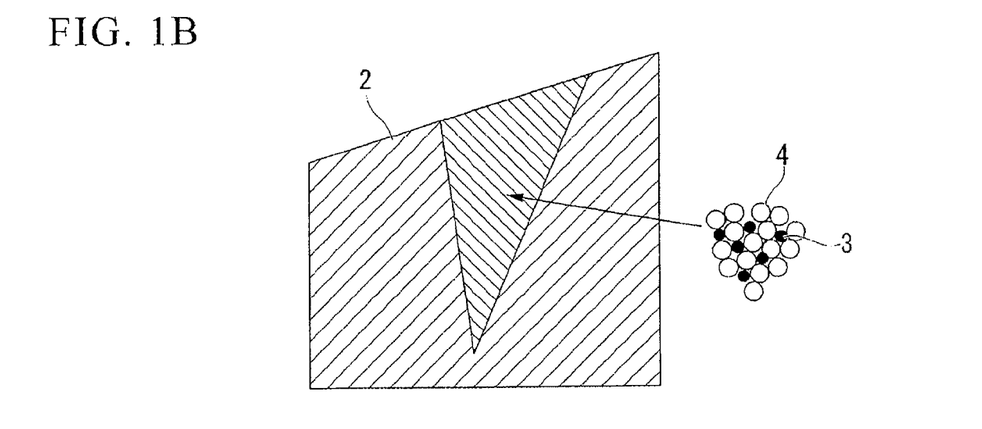
FIG. 1B shows a schematic cross section of a vicinity of a crack d filled by a repair material.
Figure 1C:
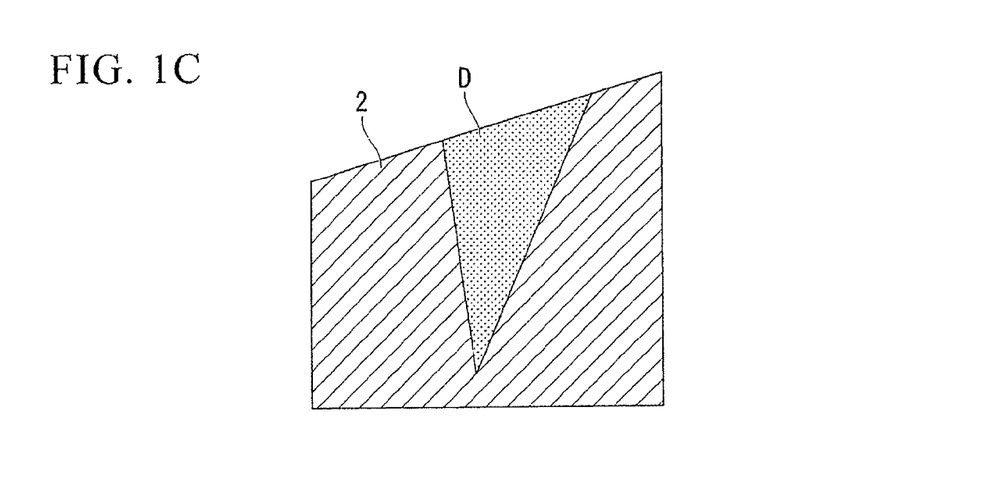
FIG. 1C shows a schematic cross section of repaired portion after the repairing. A schematic drawing showing the repair material being filled is shown in the right portion of FIG. 1B.

In the following, as an embodiment of the present invention, repair of a crack d (damaged portion) generated in a turbine nozzle 1 as shown in FIG. 1 is explained.

When the crack d generated in the turbine nozzle 1 is repaired by the braze repair method according to the present invention, firstly, a repair material is prepared by mixing a Ni-based brazing material powder 3 containing the Ni-based brazing composition of the present invention and an alloy powder 4 having a composition similar to or close to that of a base material of the turbine nozzle. The alloy powder 4 may be constituted of a powder of a single species of alloy having the same or close composition as the base material 2 composed of Ni-based superalloy, Co-based superalloy, Fe-based superalloy, or the like. Alternatively, the alloy powder may be constituted of a mixed powder of alloys of two or more species. For example, the alloy powder 4 may be constituted of Rene 80, Inconel1713C, MarM247 or the like. Grain diameters of the Ni-based brazing material powder 3, and the alloy powder 4 are controlled in the above-described ranges.

The repair material may be a slurry in which a binder is mixed. For example, Nicrobraze S cement (trade name, provided by Wall Colmonoy Corporation) may be used as the binder.

Next, the damaged portion d of the turbine nozzle 1 is filled with the repair material as shown in FIG. 1B, and is subsequently subjected to heat treatment under vacuum (reduced pressure) atmosphere. In this time, the Ni-based brazing material powder 3 is molten at a temperature lower than the melting point of the base material 2, and forms a melt (brazing liquid). The brazing liquid fills the interstices of the base material 2 and the alloy powder, and the constituent elements of the brazing liquid diffuse into the interiors of the base material 2 and the alloy powder, thereby joining the base material 2 and alloy powder 4 in integral. Before the brazing, it is preferable to clean the damaged portion d of the turbine nozzle 1.

Next, the brazed turbine nozzle 1 is cooled. After the cooling, finish processing such as polishing of the repaired portion is performed. The thus formed repaired portion has a texture different from the base material, where alloy powder and the brazing material reacted with each other by diffusion and melting.

By the above described steps, it is possible to repair the damaged portion d of the turbine nozzle 1 by brazing.

As described above, in the braze repair method according to the present invention, it is possible to repair a damaged portion d generated in the turbine nozzle 1 appropriately, and it is possible to obtain the turbine nozzle 1 (repair structure) appropriately repaired by the braze repair method.

The application of the braze repair method according to the present invention is not limited to the above-described repair of the crack (damaged portion) d generated in the turbine nozzle 1, and can be widely applied to the repair of the damaged portion generated in members by brazing. Therefore, the repair structure repaired by the braze repair method according to the present invention is not limited to the turbine nozzle having a repaired crack.

EXAMPLES

The effect of the present invention is clearly explained with reference to Examples. However, the present invention is not limited to the Examples explained below, and various modification may be made within the scope of the present invention.

Example 1

In Example 1, firstly, a repair material was prepared by mixing an alloy powder composed of MarM247 and an Ni-base brazing material powder having a composition consisting of 1.15 mass % of B, 5 mass % of Si, 17 mass % of Cr, 5 mass % of Co, 1.8 mass % of Al, 1.7 mass % of Ta, with the balance consisting of Ni and unavoidable impurities. An average grain diameter of the Ni-based brazing material powder was 90 µm and the average grain diameter of the alloy powder was 53 µm. The repair material was filled in a damaged portion actually generated in a turbine nozzle. Then, repair of the damaged portion was performed by heat treatment under a vacuum atmosphere of $1 \times 1.0^{-4}$ Torr at 1200° C. for 15 minutes, and continuously at 1125° C. for 4 hours, and subsequent cooling.

Figure 2A:
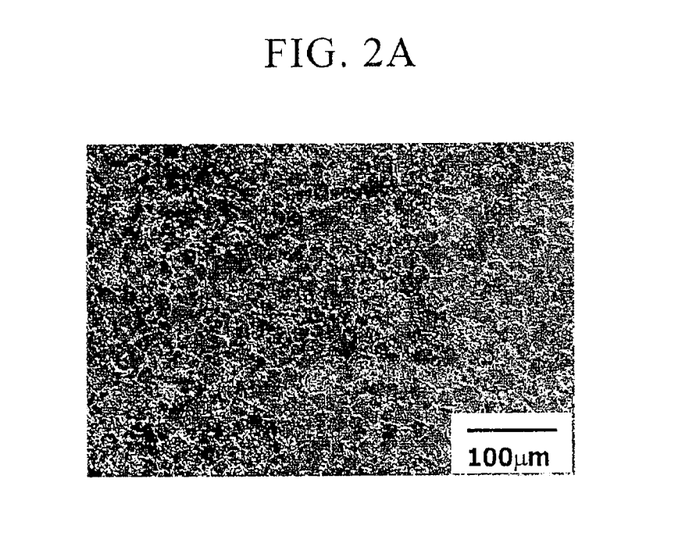
FIGS. 2A and 2B show optical microphotographs showing metal structure of a repaired portion of Example 1. The scale bar represents 100 μm in FIG. 2A, and the scale bar represents 20 μm in FIG. 2B.
Figure 2B:
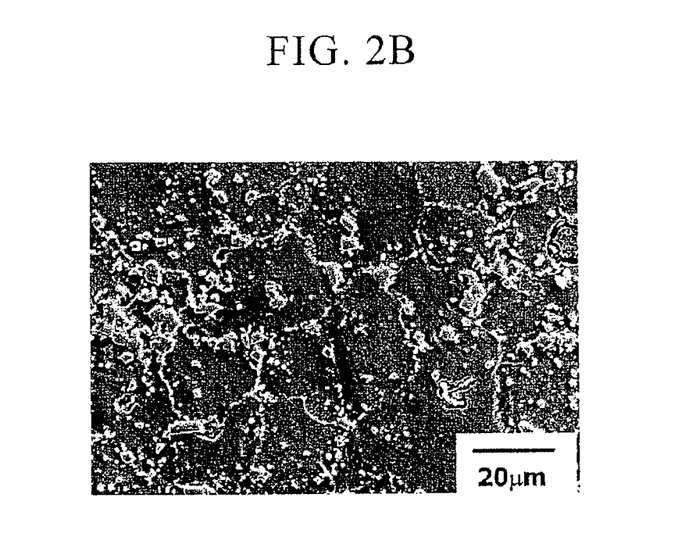

FIGS. 2A and 2B show optical microphotographs of a metal texture in the repaired portion of Example 1. The portions of bright contrast in the figure are particles of dispersed phase containing B or Si, and the dark phase is the polycrystalline alloy constituting the matrix (Similar explanation can be made to FIGS. 3A, 3B, 4A, and 4B).

In Example 1, as shown in FIGS. 2A and 2B, it was possible to refine (to control the maximum length to be 30 µm or less) the dispersed phase containing B or Si formed in the metal texture. In addition, an average grain diameter of the metal of the matrix was controlled to 48 µm or less.

The mechanical properties of the repaired portion of Example 1 were examined by subjecting the repaired portion to a creep test and a thermal fatigue test. In the thermal fatigue test, cycles of tensile and compressive stresses were applied to the test piece by performing a heat cycle test between 550° C. and 950° C. while keeping the strain of a parallel part of the test piece at constant level.

In the creep test of test stress of 69 MPa at 980° C., the fracture time was 115.5 hours. In the thermal fatigue test, the stress applied to the repaired portion could be maintained at the same level as the stress applied to the not repaired base material until a time at which a crack occurred on the surface of the test piece. The cycles for generating the crack was 100 cycles on average which was 40% of the value shown by the not-repaired base material. Thus, satisfactory mechanical properties were confirmed.

Comparative Example

In Comparative Example 1, firstly, a repair material was prepared by mixing an alloy powder composed of MarM247 and an Ni-base brazing material powder having a composition consisting of 0.75 mass % of B, 7.5 mass % of Si, 17 mass % of Cr, 5 mass % of Co, 1.8 mass % of Al, 1.7 mass % of Ta, with the balance consisting of Ni and unavoidable impurities. An average grain diameter of the Ni-based brazing material powder was 90 µm and an average grain diameter of the alloy powder was 53 µm. The repair material was filled in a damaged portion actually generated in a turbine nozzle. Then, repair of the damaged portion was performed by heat treatment under a vacuum atmosphere of $1 \times 1.0^{-4}$ Torr at 1200° C. for 15 minutes, and continuously at 1125° C. for 4 hours, and subsequent cooling.

Figure 3A:
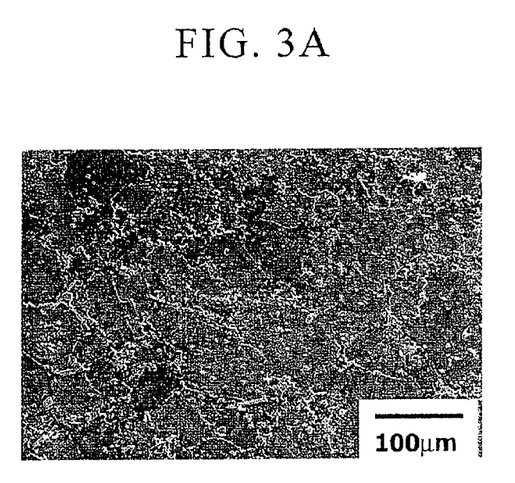
FIGS. 3A and 3B show optical microphotographs of metal structure in the repaired portion of Comparative Example 1. The scale bar represents 100 μm in FIG. 3A, and the scale bar represents 20 μm in FIG. 3B.
Figure 3B:
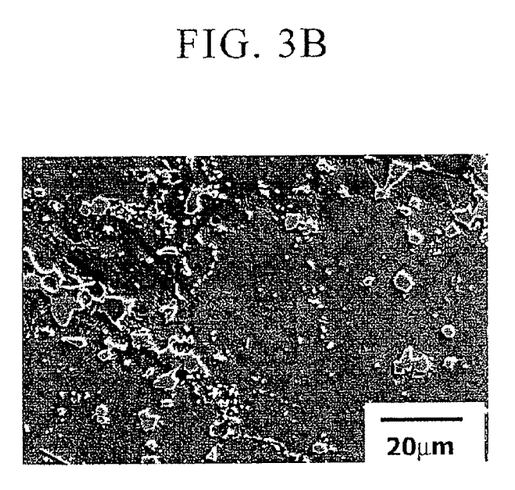

FIGS. 3A and 3B show optical microphotographs of metal texture of the repaired portion of the Comparative Example 1.

In Comparative Example 1, as shown in FIGS. 3A and 3B, metal texture was coarsened, and it was impossible to control the average grain diameter of the matrix metal to 100 µm or less.

In Comparative Example 1, a test piece showed a fracture time of about 17% (20 hours) of that of Example 1 in a creep test of test stress of 69 MPa at 980° C. That is, satisfactory mechanical properties could not be obtained in the repaired portion.

Comparative Example 2

In Comparative Example 2, a repair material was prepared by mixing an alloy powder composed of MarM247 and an Ni-base brazing material powder having a composition not containing Si and consisting of 2.3 mass % of B, 15 mass % of Cr, 10 mass % of Co, 3.5 mass % of Al, 3.4 mass % of Ta, with the balance consisting of Ni and unavoidable impurities.

An average grain diameter of the Ni-based brazing material powder was 90 μm and an average grain diameter of the alloy powder was 53 μm. The repair material was filled in a damaged portion actually generated in a turbine nozzle. Then, repair of the damaged portion was performed by heat treatment under a vacuum atmosphere of $1\times1.0^{-4}$ Torr at 1200° C. for 15 minutes, and continuously at 1125° C. for 4 hours, and subsequent cooling.

Figure 4A:
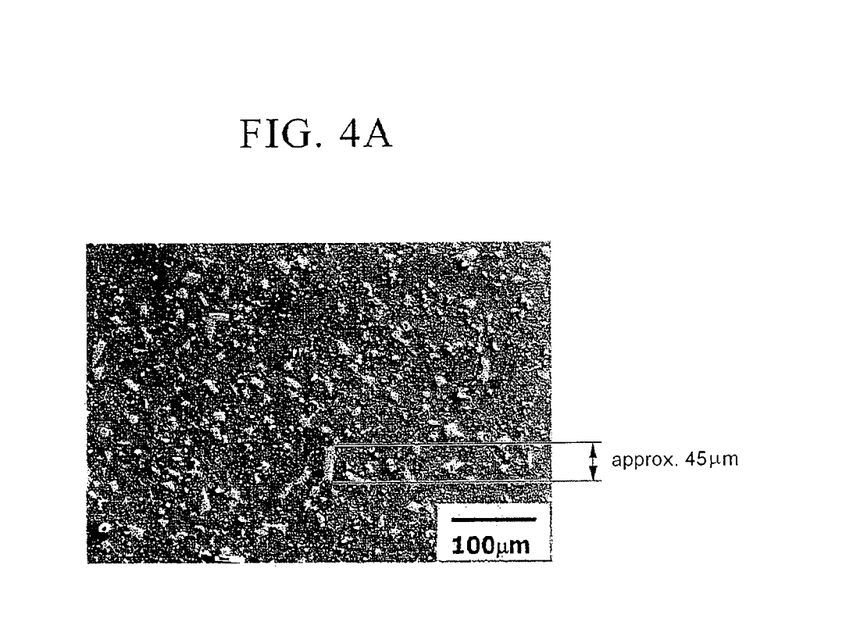
FIGS. 4A and 4B show optical micrograph of metal structure in the repaired portion of Comparative Example 1. The scale bar represents 100 μm in FIG. 4A, and the scale bar represents 20 μm in FIG. 4B.
Figure 4B:
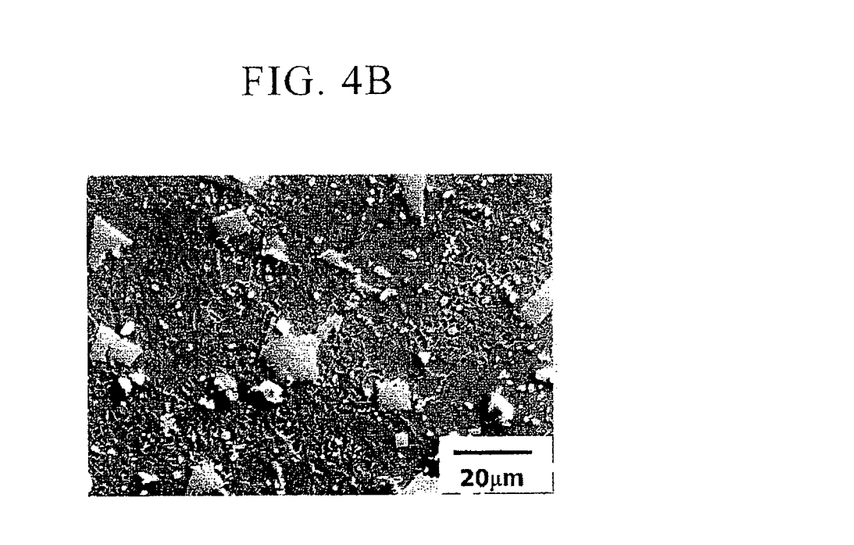

FIGS. 4A and 4B show optical microphotographs of metal texture of the repaired portion of the Comparative Example 2.

In Comparative Example 2, as shown in FIG. 4A, metal matrix had a finer grain size than that of Comparative Example 1. However, it was impossible to refine the disperse phase containing B or Si such that the maximum length was 30 μm or less.

In Comparative Example 2, a similar result as that of Example 1 could be obtained in creep test of test stress of 69 MPa at 980° C. However, as a result of the thermal fatigue test by performing heat cycle test between 550° C. and 950° C., an average of 44 cycles were necessary to generate a crack, which was about 44% of that of Example 1. Therefore, in Comparative Example 2, the mechanical properties of the repaired portion were not satisfactory compared to Example 1.

In the above-described result, compared to Comparative Example 1 in which the average grain size of the matrix metal exceeded 100 μm, Comparative Example 2 having relatively fine matrix metal and Example 1 in which average grain size of matrix metal was not larger than 100 μm showed satisfactory results in the creep test. Compared to Comparative Example 2 in which the maximum length of dispersed phase containing B or Si exceeded 30 μm, Example 1 in which the maximum length of dispersed phase containing B or Si was not larger than 30 μm showed superior thermal fatigue strength. From these results, the followings could be understood. For improving the creep properties of the repaired portion, it is effective to control the average grain diameter of the matrix metal to 100 μm or less. For improving the thermal fatigue strength of the repaired portion, it is effective for controlling the maximum length of the dispersed phase containing B or Si to 30 μm or less. According to the brazing composition of the present invention, and according to the repair method using the brazing composition, both of the above-described conditions could be satisfied, and it is possible to provide a repair structure in which a repaired portion has excellent creep properties and thermal fatigue strength.

Figure 5:
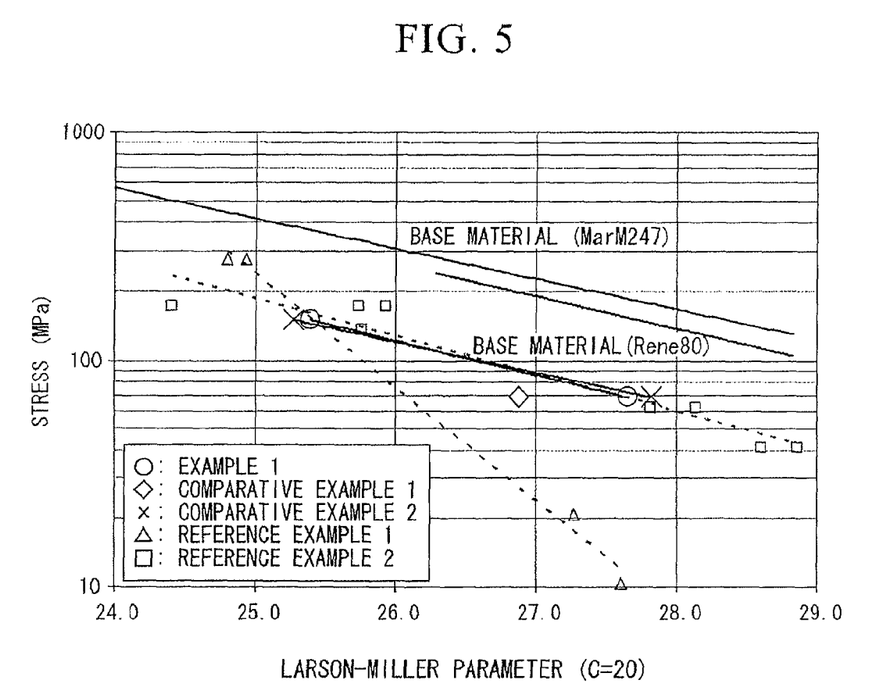
FIG. 5 shows a graph in which creep properties measured in Example 1, Comparative Examples 1, and 2 are compared to the creep properties of the base material, and the creep properties of a repaired material repaired in accordance with the conventional art.

The creep properties of the Examples and Comparative Examples of the present invention were compared with the creep properties of conventional braze repaired member in FIG. 5 where vertical axis denotes stress, and horizontal axis denotes Larson-Miller parameters. The Larson-Miller parameter is a value calculated by a formula of T(C+logt), where T denotes an absolute temperature, C denotes a material constant, and t denotes a fracture time. Here, the material constant was set at 20.

The data Example 1 were plotted as open circles (o), the datum of Comparative Example 1 was plotted as an open diamond, the data of Comparative Example 2 were plotted as christcrosses (X). As Conventional members, creep properties of repaired members repaired using Ni-base brazing materials described in Non-Patent Reference 1 were plotted as Reference Example 1 shown by open triangles, and Reference Example 2 shown by open squares (□) (Non-Patent Reference 1: W. A. Demo, S. Ferrigno, D. Budinger, and E. Huron, Improving Repair Quality of Turbine Nozzles Using SA659 Braze Alloy, Superalloys 2000, Jan. 8, 2000, TMS2000, pages 713-720). Reference Example 1 showed data of the repaired member repaired using a brazing material containing 2.3 wt % of B, and Reference Example 2 showed data of repaired member repaired using a brazing material in which B content was reduced to be not higher than 1%, and creep strengthening elements such as Mo and W were added to strengthen the creep properties. With respect to base material composed of Ni-based superalloy, creep properties of two base materials, MarM247 and Rene80, were shown by solid lines in FIG. 5. Data of the creep properties of the base materials were quoted from Non-Patent Reference 2 (C. T. Sims, N. S. Stoloff, W. C. Hagel, Supperalloys II, September 1987. John Willey & Sons, page 640).

As shown in FIG. 5, Example 1 of the present invention shows far superior creep properties compared to Reference Example 1 using conventional brazing material, and shows substantially similar creep properties as Reference Example 2 of improved creep properties.

Comparative Example 2 shows creep property similar to those of Example 1 and Reference Example 2, but as explained above, shows thermal fatigue strength inferior to that of Example 1.

From the above-described result, it can be understood that, when repair is performed using a brazing composition of the present invention, repaired structure and metal texture of the repaired portion show creep property similar to the conventional case and are excellent in other mechanical properties such as thermal fatigue strength.

Industrial Applicability

According to the present invention, it is possible to provide a brazing composition that enables repair by brazing in which the grain size of B or Si-containing phase formed in a metal texture after the brazing is refined, and while keeping a similar melting point as the conventional case, and while keeping similar creep properties of the metal after the brazing as the conventional case, other mechanical properties such as thermal fatigue strength are improved.

What is claimed is:

1. A Ni-based brazing composition consisting of, in mass %, 1.0% or more and 1.3% or less of B, 4.5% or more and 5.5% or less of Si, and the balance consisting of Ni and unavoidable impurities, wherein the brazing composition forms a matrix of polycrystalline alloy and dispersed phase containing B or Si in a metal texture after the brazing, where average diameter of the alloy of the matrix is 100 μm or less, and a maximum length of the dispersed phase is 30 μm or less.

2. A Ni-based brazing composition according to claim 1, wherein a content of each of impurity elements is 0.05% or less by mass.

3. A brazing composition consisting of, in mass %, 1.0% or more and 1.3% or less of B, 4.5% or more and 5.5% or less of Si, one or two or more selected from a group consisting of Pd, Zr, and Hf, and the balance consisting of Ni and unavoidable impurities, wherein the brazing composition forms a matrix of polycrystalline alloy and dispersed phase containing B or Si in a metal texture after the brazing, where average diameter of the alloy of the matrix is 100 μm or less, and a maximum length of the dispersed phase is 30 μm or less.

4. A Ni-based brazing composition according to claim 3, wherein a content of each of impurity elements is 0.05% or less by mass.

5. A brazing composition consisting of, in mass %, 1.0% or more and 1.3% or less of B, 4.5% or more and 5.5% or less of Si, 25% or less of Cr, 15% or less of Co, 4.0% or less of Al, and 4.0% or less of Ta, one or two or more selected from a group consisting of Pd, Zr, and Hf, and the balance consisting of Ni and unavoidable impurities, wherein the brazing composition forms a matrix of polycrystalline alloy and dispersed phase containing B or Si in a metal texture after the brazing, where average diameter of the alloy of the matrix is 100 μm or less, and a maximum length of the dispersed phase is 30 μm or less.

6. A Ni-based brazing composition according to claim 5, wherein a content of each of impurity elements is 0.05% or less by mass.

* * * * *

UNITED STATES PATENT AND TRADEMARK OFFICE
CERTIFICATE OF CORRECTION

PATENT NO.        : 8,491,837 B2
APPLICATION NO.   : 12/676065
DATED             : July 23, 2013
INVENTOR(S)       : Oiwa et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 533 days.

Signed and Sealed this
Eighth Day of September, 2015

Michelle K. Lee
*Director of the United States Patent and Trademark Office*